Figure 1:
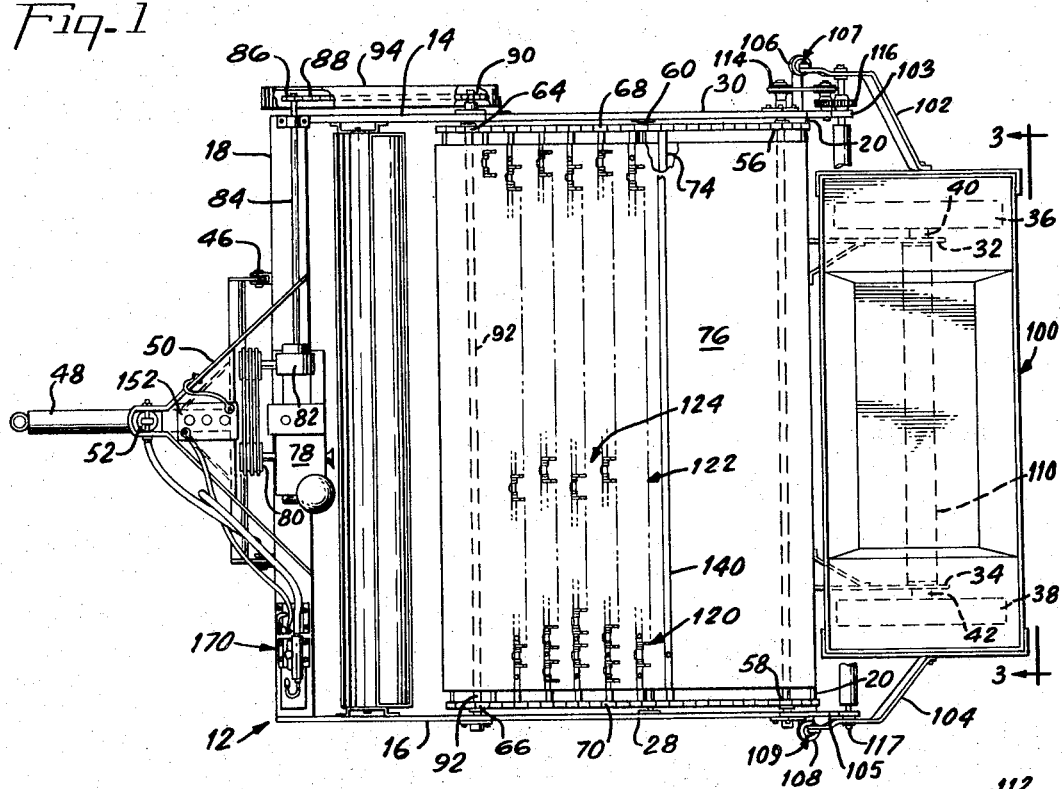

Jan. 9, 1968   H. S. BARBER   3,362,480
MACHINES FOR CLEANING SAND BEACHES
Filed Dec. 9, 1964   2 Sheets-Sheet 1

INVENTOR
HAROLD S. BARBER
BY
ATTORNEY

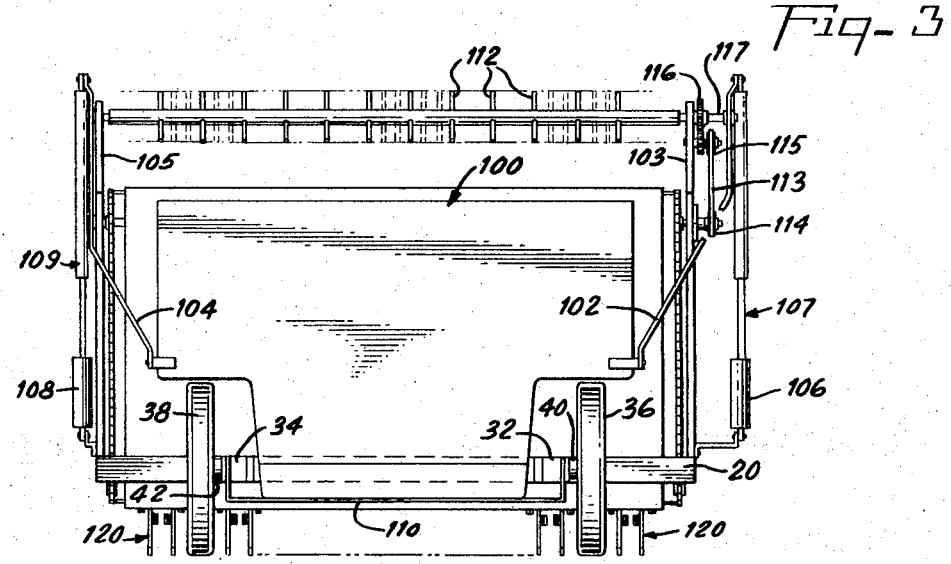
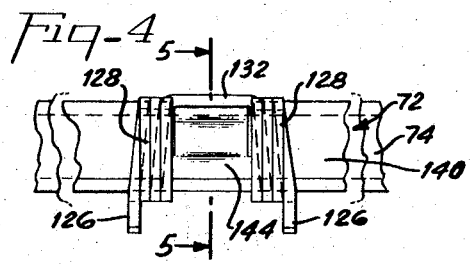
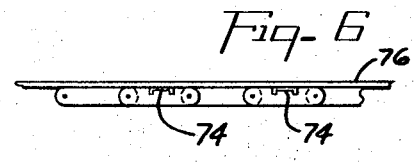
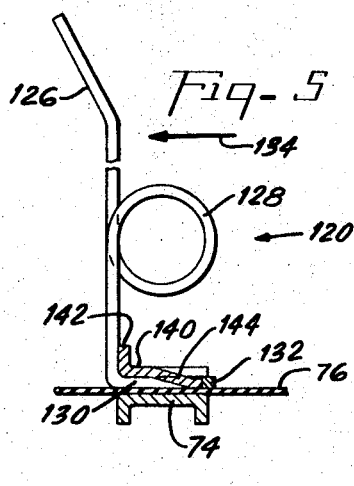
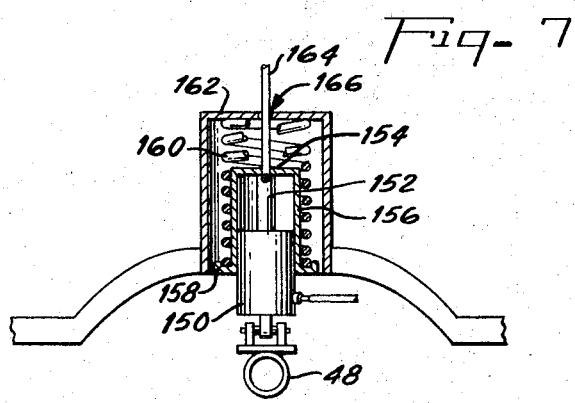

United States Patent Office 3,362,480
Patented Jan. 9, 1968

3,362,480
MACHINES FOR CLEANING SAND BEACHES
Harold S. Barber, Windmill Farms,
Armonk, N.Y. 10504
Filed Dec. 9, 1964, Ser. No. 417,010
5 Claims. (Cl. 171—89)

This invention relates to the separation of unwanted debris from soil or the like and particularly to an improved method and apparatus for cleaning sand bathing beaches or other sandlike tracts of unwanted refuse, litter and other types of debris.

The littering propensities of the general public at beaches and other sandy recreation areas appears to be unlimited as to both the quantity and character of the refuse and litter involved and, also, wholly uncontrollable from any practical standpoint. The unavoidable accumulation of such refuse or debris, when coupled with the accumulation of naturally originating debris such as sea grasses, oversized shells, marine residues, and other and varied water deposited material, has created ever increasing problems for those responsible for the maintenance of cleanliness at such locations. The continually increasing magnitude of such problem with the attendant economic aspects of the continually increasing cost of effecting such debris removal has resulted in a demand for mechanized beach cleaning apparatus and numerous expedients have been advanced by the art as proposed solutions to the problem. Most of such expedients, if not effectively all that have reached commercial fruition, operate in such manner as to initially skim or otherwise physically separate a predetermined depth of sand from the surface thereof, then screen or otherwise mechanically separate such sand from the debris contained therein and then subsequently return the screened sand to the beach surface and convey the separated debris to a receptacle for ultimate disposition.

The operational capability and efficiency of apparatus incorporating such mode of operation is, however, inherently limited by the rate at which the screening or other mechanical sand-debris separation step can be effected. Such separation rate is determined, at least in part, by the nature and minimum size of debris whose separation is to be effected, the available area for effecting such separation and by the character and moisture content of the sand being cleaned. However, even with dry sand and under the most favorable operating conditions, the rate of sand-debris separation is normally so severely limited for any reasonably sized apparatus as to so circumscribe the permitted rate of unit advance and consequent operational capability to such a point as to render economically feasible use thereof doubtful at best. Moreover, the rate of sand-debris separation markedly decreases in accord with the moisture condition of the sand and most of such conventionally constructed units approach complete inoperability, from any practical standpoint, when high moisture content sand is to be cleaned.

This invention may briefly be described as an improved method and apparatus for effecting the separation of unwanted debris or other material from soil-like material, such as beach sand, and which includes, in its broad aspects, the continuous lineal advance of pluralities of independently displaceable spring-like tines through the soil to be cleaned while simultaneously independently displacing said tines in a direction concurrent to the direction of lineal advance thereof followed by an abrupt change of direction in the independent displacement of said tines to an upward direction and out of the soil and deflection of debris displaced from said soil by the action of said spring-like tines to a common location for convenient disposition thereof.

Among the advantages of the subject invention is the permitted provision of debris separation devices, such as beach cleaners, that are characterized by a simplicity of construction that affords appreciable economies both as to initial cost and necessary maintenance; an effective operational capability substantially independent of the moisture content of the soil being cleaned; an avoidance of the limitations inherent in conventionally constructed skimmer type units with auxiliary screening or mechanical debris separation; a permitted range of adjustment that affords maximum operating capability and efficiency in accord with the character of the soil-like material being cleaned and the nature of the debris to be separated therefrom and the provision of a mode of operation that increases operational capability to such an extent as to render mechanical sand beach cleaning and similar endeavors economically feasible and attractive.

Still other advantages attendant the subject invention is an improved scarifying and debris elevating action which tends to increase the effective depth of debris-soil separation and an operational capability in sands or soil-like material having a relatively high compacted density, such as dredge deposited beach sands.

The primary object of this invention is the provision of an improved method and apparatus for effecting separation of unwanted debris from soil-like material such as, for example, the separation of debris of both manmade and natural origin from sand in bathing areas or the like.

Other objects and advantages of the subject invention will be set forth in the following portions of this specification and will be apparent to those skilled in this art from the accompanying drawings which delineate, by way of illustrative example, the principles of the invention as the same are incorporated in a presently preferred embodiment in the nature of a beach sand cleaning apparatus.

Figure 2:
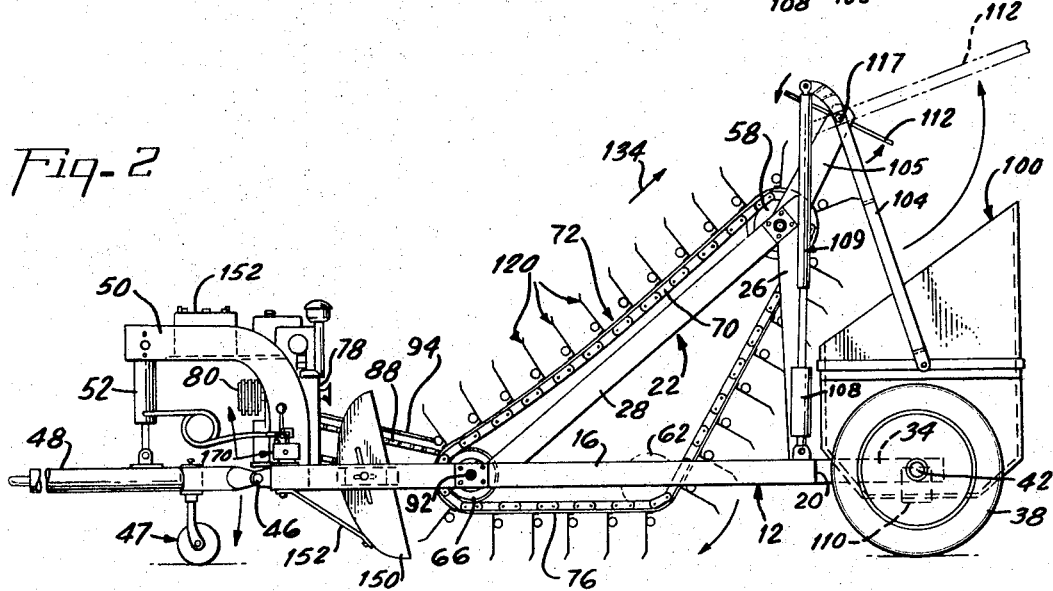

Referring to the drawings:
FIGURE 1 is a plan view of a sand beach cleaning apparatus incorporating the principles of this invention;
FIGURE 2 is a side elevation of the apparatus illustrated in FIGURE 1;
FIGURE 3 is a vertical section as taken on the line 3—3 of FIGURE 1;
FIGURE 4 is an enlarged plan view of a tine member and its mounting;
FIGURE 5 is a vertical section as taken on the line 5—5 of FIGURE 4; and
FIGURE 6 is a fragmentary side elevation of a portion of the tine supporting belt covered bar flight conveyor;
FIGURE 7 is a schematic view of a preferred construction for the cantilever beam assembly adapted to control the elevation of the front end of the unit relative to the surface of the beach being cleaned.

Referring to the drawings and particularly to FIGURES 1 and 2 thereof, there is provided a preferred embodiment of a beach cleaning apparatus incorporating the principles of this invention. As illustrated, such unit includes a generally rectangularly shaped perimetric base frame portion, suitably formed of beam like members such as flat stock, angle or channel iron, and generally designated 12. Such frame is made up of a pair of spaced side frame members 14, 16 that are terminally bridged by front and rear frame members 18 and 20 respectively. Mounted upon the rear half of the side wall members 14 and 16 and extending upwardly therefrom are a pair of generally triangularly shaped side wall frame assemblies conveniently formed of bar stock and generally designated 22. Such frame assemblies are conveniently constituted, as best shown in FIGURE 2, by vertically disposed frame members 24 and 26 mounted at the rear of each side frame member and associated generally angularly disposed brace members 28 and 20 terminally connected at one end to the aforesaid vertical frame members 24 and 26 and at the other end with the related side frame member in the vicinity of the midpoint thereof as described above.

The frame assembly is terminally supported at its rear or trailing end by a pair of pneumatic tired wheels 36, 38 of suitable size to support the unit in predetermined spaced relation to the sand beach surface to be cleaned. The wheels 36, 38 are preferably individually mounted on stub axle means 40, 42 that are adjustably mounted on the wheel support members 32, 34 that extend from the rear frame member 20 of the perimetric base frame 12. The adjustable mounting of the stub axle means on the wheel support members provides a control of the height of the rear portion of the perimetric base frame 12 from the surface of the sand to be cleaned.

Pivotally secured, as at 56, to the front cross frame member 18 is a generally T shaped draw bar 48 having a connecting means such as an eye at the terminal end thereof for connection of the subject apparatus to an independent prime mover, such as a tractor or the like, to effect advance the above described wheel supported frame relative to the sand beach to be cleaned.

A swivel mounted caster wheel assembly 47 may desirably be mounted on the draw bar 48 in such manner as to be pivotally displaceable out of its operative dependent position when the subject apparatus is in use and yet be available to support and permit ready displacement of the unit, without a prime mover, while in storage or otherwise not in use. Also mounted on the front cross frame member 18 is the bifurcated base portion of cantilever beam assembly, generally designated 50, having its suspended terminal end disposed in overlying coaxial relation with the shaft of the draw bar 48. A hydraulic cylinder assembly 52 is disposed intermediate the suspended terminal end of the cantilever beam 50 and the aforesaid draw bar 48 so as to control the spacing therebetween and consequent angular disposition of the draw bar 48 relative to the perimetric frame and to thereby control the elevation of the front end of said perimetric base frame 12 relative to the surface of the sand to be cleaned.

Disposed within the described frame is an independently displaceable tine supporting conveyor belt assembly having a path of travel in the general configuration of a scalene triangle. Included in such assembly and defining the terminal points of the specified path of travel are a first pair of idler sprockets 56, 58 mounted at the apex of the vertically disposed side wall portions 22 of the frame assembly; a second pair of idler sprockets 60, 62 mounted on the side frame members 14 and 16 of the perimetric base frame 12 and a pair of drive sprockets 64, 66 mounted on side frame members 14 and 16 of the perimetric base frame 12 slightly forward of the point of junction of the base members 26, 28 with the side frame members 14 and 16. The respective sets of drive sprockets are operatively interconnected by multi-link chain members 68 and 70, which form a supporting component for bar flight conveyor covered with a laminated rubber covered belting material 76 and generally designated 72. The bar flight conveyor is conveniently formed of a plurality of uniformly spaced channel shaped cross bars 74 terminally secured to the outside links of the aforesaid chain members 68 and 70 (as shown in FIGURE 6) which serve to support and provide a base connection for the rubber surfaced and laminated conveyor belt material 76.

In the preferred construction the idler sprockets 60, 62 are rendered adjustably positionable in both the vertical and horizontal directions to serve as belt tighteners as well as to accommodate chain wear and permit a control over the path of belt travel relative to grade. Also, idler wheels are preferably mounted on each of the sprockets supporting shafts so as to provide support for the midsection of the conveyor belt.

The displacement of the belting material covered bar flight conveyor 72 over the path of travel defined by the idler and drive sprockets and relative to the frame assembly is conveniently effected by means of a self-contained drive system which may suitably include a relatively small internal combustion engine 78 mounted on the front cross frame member 18 as the prime power source. As illustrated, the drive pulley of engine 78 is suitably connected by drive belts 80 to a gear reducer 82 which may also be conveniently mounted on said front cross frame member 18. The output of the gear reducer 82, in the form of an elongate drive shaft 84 having a sprocket 86 mounted on the end thereof, is in turn connected through an auxiliary drive chain 88 to a sprocket 90. In the illustrated embodiment the sprocket 90 is drivingly mounted on a common shaft 92 with the aforesaid drive sprockets 64 and 66 for the bar flight conveyor drive chains 68, 70. Because of their disposition exteriorly of the perimetric frame, the sprockets 86 and 90 and interlinking drive chain 88 are preferably covered by a suitable guard member 92. As will be apparent to those skilled in this art, operation of the described drive system effects displacement of the belt covered bar flight conveyor 72 in the clockwise direction as indicated by the directional arrows on the showing of FIGURE 2 along a path in the general configuration of a scalene triangle. Such path includes a base leg portion intermediate the second pair of idler sprockets and the drive sprockets that is substantially parallel to the base frame and of limited length, and, after an abrupt change of direction during passage over the drive sprockets an inclined conveyor leg portion that terminates at an elevated location above the mouth of the hopper 100.

The debris receiving hopper, generally designated 100, is mounted on the rear of the perimetric base and is preferably shaped so as to have its base portion sized to be disposed intermediate the rear support wheels 36, 38 and with its upper portion of increased transverse extent so as to overhang the same to provide for maximum debris containing capacity thereof.

The hopper 100 is supported by a transverse shelf member 110, terminally secured to and supported by the wheel support members 32, 34 and by a pair of elongate crank members 102, 104. The crank members 102, 104 are pivotally mounted, adjacent their upper extremities, on frame extensions 103, 105 which are disposed at the apex of the side wall frame members and extend upwardly and rearwardly therefrom. The cranks 102, 104 are adapted to be pivotally displaced about their pivotal mountings by reciprocation of the elongate piston rods 107, 109 pivotally connected to the stub end extensions of the crank members as effected by actuation of the hydraulic cylinders 106, 108. As will be apparent, retraction of the piston rods 107, 109 will effect rotative displacement of the cranks 102, 104 and consequent elevation of the hopper 100 into position suitable for debris transferral to an auxiliary vehicle. The necessary rotative displacement of the hopper to effect emptying thereof, after a predetermined degree of elevation, is conveniently effected by means of a trip cord or chain connected intermediate the frame and the rear wall of said hopper.

Mounted on the surface of the belting material 76 covering of the bar flight conveyor 72 are a multiplicity of spring-like tine members 120. The tine members 120 are preferably arranged in spaced rows 122 transverse to the direction of conveyor advance and with the individual tine members in each row being disposed in a staggered or offset relationship from the tine members in the rows immediately preceding and following the same as illustrated at 124. As best shown in FIGURES 4 and 5, each of the spring-like tine members 120 is preferably shaped to be of a generally U shaped configuration providing a pair of parallel extending legs with a common and transversely disposed base portion. Each of the extending legs includes an angularly disposed or offset terminal end portion 126, an intermediate coil or loop portion 128 and a laterally offset base segment 130. Each of the laterally offset base segments 130 are interconnected by a bridging segment 132 which serves to form, in combination with said offset base segments 130, a laterally offset and generally U shaped common base portion for mounting purposes. The mounting of the individual spring-like tine members on the conveyor belt is readily effected by disposition of the laterally offset U shaped base portion thereof in overlying relationship with the transverse bars 74 of the bar flight conveyor 72. More specifically, the base portion of the tine members are positioned so as to dispose the terminally offset end portions 126 in the direction of conveyor belt advance as indicated by the directional arrow 134 and with the intermediate coil or loop portions 128 positioned in coaxial alignment with said direction of advance. When each tine is so located in a given row 122 it is secured in such position by means of a pressure bar 140 disposed in overlying relationship with the base portion thereof and secured to the underlying transverse bars 74 of the bar flight conveyor 72. As illustrated, the pressure bar 140 includes a flanged leading edge 142 disposed in abutting relationship with the lower portion of the tine legs to cooperately assist the coil or loop portion 128 in resisting bending deformation of the tines in a direction counter to the direction of tine advance, together with depressed looking tongue portions 144 sized to be disposed in abutting relation with the conveyor belt surface intermediate the arms of the U shaped base portion thereof.

As will be apparent from the foregoing, the described tine assembly and the mounting thereof is such as to provide a lock type mounting, but yet permits the inherent resilience of the tines to resist deflection by forces tending to bend the same in a direction counter to tine advance.

Disposed between the side frame members 14 and 16 in front of the drive sprockets 64 and 66 and extending across the transverse extent of the conveyor assembly is an arcuate debris deflection shield 150. As illustrated, the deflection shield is adjustably positioned so that its angular disposition relative to the above discussed conveyor belt assembly can be preselected by the operator and secured in any desired position by support beam 152.

In order to effect removal of debris that is impaled or otherwise engaged on or between the tine members, a tine cleaning assembly is provided. As illustrated, such tine cleaning assembly includes an elongate rotatable brush or comb like member 112, mounted intermediate the frame extensions 103, 105. Rotation of the brush member 112 in the direction indicated by the arrows is effected by means of a drive pulley 114 mounted on the shaft for the idler sprockets 56, 58 connected by a V belt 113 to a combination pulley and spur gear 115 which in turn engages a spur gear 116 secured to the brush shaft 117. As will be apparent, rotation of the ider sprockets 56, 58 effects a concomitant rotation of the pulley 114 mounted on the idler sprocket shaft. Rotation of the pulley 114, through the above described drive connection, effects a rotation of the brush shaft in a direction opposite to that of the idler sprocket shaft and at an appreciably greater rotative speed. The brush or comb elements will thus be displaced relative to the tines and will function to separate debris impaled thereon or otherwise engaged therewith and direct the same into the hopper 100.

Operation of the described apparatus in a cleaning operation on a sand beach, for example, is effected by connecting the subject device, as by the draw bar 48, to a pull type of prime mover such as a tractor or the like. When so positioned the depth of tine penetration into the sand is adjusted by adjusting the position of the rear wheels 36, 38 relative to the frame and/or by adjusting the height of the front portion of the frame by actuation of the hydraulic cylinder 52. Preferably the heretofore described hydraulic components are included in a self-contained system that includes an electrically powered hydraulic pump and valve assembly generally designated 160 and conveniently located on the front cross beam together with a battery 152 for hydraulic pump power purposes. As will be apparent from the foregoing, the above described dual positioning adjustments together with the adjustments of the position of the sprockets 60, 62 permit operator selection of both the depth of penetration of the tines into the sand to be cleaned as well as the slope of the path of travel thereof.

With the depth of tine penetration so pre-set, independent advance of the conveyor belt mounted tine assembly relative to the perimetric frame and in the direction indicated by the arrows 134 is effected by means of the prime mover 78. The direction of such independent advance of the tine assembly through the soil to be cleaned will be concurrent to the direction of advance of the entire assembly. The net effect of the above will be the sequential passage of the rows of spring like tines through the sand to be cleaned at a rate greater than that of unit advance and in an accumulation of litter, refuse or other debris disposed in the path of tine advance at the forward end of the conveyor belt assembly. As the belt covered bar flight conveyor 72 passes over the drive sprockets 64 and 66 the direction of the tine advance is abruptly changed and the speed of the end portions thereof is increased. Such change in direction and rate of displacement results in a bending deformation of the tine members against the inherent resistance of the intermediate coil section and the basal mounting thereof. Such deformation will progressively increase during change of direction and will be abruptly released as the tines approach the sand surface. Such release of the stored kinetic energy effects a reformation of the tines and in a consequent displacement of any debris in their path upwardly and out of the sand. As will now be apparent, such deformation and reformation of the tines can be conveniently described as a whip or snap action. The debris displaced from the sand by the above defined snap or whip action of the spring-like tine members is deflected by the shell 150 on to the inclined portion of the belt covered bar flight conveyor 72 disposed intermediate the drive sprockets 64, 66 and the elevated idler sprockets 56, 58. Most, if not all, of the sand deflected by the snap action of the tines and by the displaced debris will return to the beach surface through the passage intermediate the shell 150 and the forward end of the conveyor belt. The deflected debris will thus move with the continued displacement of the conveyor and will drop into the debris collecting hopper 100 as the conveyor is displaced advanced past the upper idler sprockets 56, 58. The separated debris will thus accumulate in the hopper 100 and can be periodically transferred therefrom to a disposal vehicle by the elevation of the hopper 110 by means of the hydraulic cylinders 108, 110 and accompanying rotation displacement thereof. As mentioned earlier, an auxiliary doctor brush assembly is desirably provided adjacent the upper sprockets to effectively separate paper and other materials that might be impaled upon the tines and to direct the same into the collecting hopper 100.

FIGURE 7 shows the essentials of certain preferred constructional details for the interconnection of the cantilever beam or gooseneck 50 and the draw bar 48 as broadly illustrated in FIGURES 1 and 2. As illustrated, a hydraulic cylinder 150 is mounted on the draw bar 48. The piston rod 152 thereof engages the base 154 of a displaceable sleeve 156 sized to enclose the hydraulic cylinder. As illustrated, the sleeve 156 is provided with an extending dependent flange 108 which serves as a base support for a biasing spring 160 having its upper end contained within the generally U shaped terminus 162 of the cantilever beam 50. A guide rod 164 extends from the base of the sleeve 156 through an aperture 166 in the beam for guiding and alignment purposes. The above described elements essentially constitute a hydraulically adjustable spring suspension. In operation of the subject device the position of the hydraulic cylinder piston controls the spacing intermediate the beam 50 and draw bar 48 as previously described. However, the described spring mount provides sufficient resiliency to permit the tines to raise over the crests of minor undulations in the sand or soil and to follow the vales without manual adjustment as well as providing for a more constant angle between the spring like tine members and the soil and tends to prevent the deposit of debris in localized low areas.

As will be now apparent from the foregoing, the subject method of operation and apparatus differs markedly from the mode of operation and construction of conventional apparatus, and that the subject invention provides a degree of flexibility and control that has not heretofore been obtainable. By way of example, the size and spacing of the spring-like tines on the conveyor 72 can readily be preselected in accordance with the particular type of debris that is to be separated. In addition, both the speed of unit advance and the speed of independent advance of the tines may also be preselected and adjusted so as to provide for maximum cleaning efficiency and machine capability in accord with the environmental operating conditions that are encountered. As pointed out earlier and as will now be apparent to those skilled in the art, the subject unit completely avoids the limitations inherent in the conventionally employed screening operation and thereby avoids the operational limitations inherent in conventionally employed constructions. Preliminary tests on the subject unit have indicated a markedly increased operational capability insofar as permitted rates of unit advance is concerned. Such tests have also shown that the operative effectiveness of the subject unit is substantially independent of the character of the soil or soil like material and in particular is substantially independent of the moisture content of the sand, which, as heretofore noted, is one of the factors that makes the subject unit particularly adaptable for beach cleaning operations.

Having thus described my invention, I claim:

1. Apparatus for separating unwanted debris from soil-like material comprising
   a frame assembly lineally advanceable relative to and above the surface of said soil-like material,
   independently displaceable debris impervious endless belt means mounted on said frame assembly having a first path of travel substantially parallel and adjacent to the surface of said soil-like material and in a direction concurrent to that of frame advance and a second path of travel in a direction generally opposite to that of frame assembly advance,
   successions of elongate, elastically resilient spring-like tine members extending substantially normal to said endless belt means over the major portion of their entire length and displaceable in conjunction therewith to effect independent advance of said tine members through said soil-like material with at least the dependent end portions thereof being disposed generally transverse to the direction of lineal advance thereof and elastically deformed in a direction opposite to that of said lineal advance by the resistance of said soil-like material to the passage of the tine members therethrough,
   means for displacing said belt means and the tine members mounted thereon in a direction concurrent to frame assembly advance during said first path of travel to supplement the elastic deformation of said spring-like tine members in a direction opposite to the direction of advance thereof,
   means for independently displacing said endless belt means from said first to second path of travel to abruptly change the direction and speed of the independent displacement of said tine members progressively upwardly and out of said soil-like material to effect an initial increase in the elastic deformation of said tine members directed opposite to the direction of advance thereof followed by rapid elastic reformation of said tine members as they approach emergence from said soil-like material to effect substantially selective impelled displacement of said debris therefrom,
   and debris deflecting means disposed adjacent the point of emergence of said tine members from said soil-like material to change the direction of the impelled displacement of said debris after disengagement thereof from said tine members and to direct the same on to said endless belt means within the second path of travel thereof.

2. The apparatus as set forth in claim 1 wherein said debris deflecting means is adjustably mounted on said frame assembly.

3. The apparatus as set forth in claim 1 wherein said debris deflecting means includes a dependent edge portion adjustably positionable relative to the surface of the soil-like material being cleaned.

4. The apparatus as set forth in claim 1 wherein said spring-like tine members are arranged in successive spaced rows across said endless belt means.

5. The apparatus as set forth in claim 1 wherein said spring-like tine members include
   a base section securable to said endless belt means,
   an elongated intermediate section extending substantially normal to said endless belt means and incorporating integral spring means, and
   a terminal end portion angularly offset in the direction of advance of said endless belt means.

References Cited

UNITED STATES PATENTS

| | | | |
|---|---|---|---|
| 1,482,663 | 2/1924 | Shouldice. | |
| 2,093,148 | 9/1937 | Hoffnagel et al. | 171—89 |
| 2,812,029 | 11/1957 | Sund. | |
| 3,026,667 | 3/1962 | Morrison et al. | 56—400 |
| 3,099,347 | 7/1963 | Dahlquist | 56—400 |

ABRAHAM G. STONE, *Primary Examiner.*

ANTONIO F. GUIDA, *Examiner.*